United States Patent Office 2,732,320
Patented Jan. 24, 1956

2,732,320
PROCESS OF PREPARING ORGANO-POLYSILOXANE COATINGS

Clement Joseph Guillissen, Uccle-Brussels, and Abraam Gancberg, Forest-Brussels, Belgium No Drawing. Application February 7, 1955,
Serial No. 486,711

Claims priority, application Belgium January 31, 1951

9 Claims. (Cl. 117—103)

Organo-polysiloxanes varnishes comprise essentially one or more partly polymerized organo-polysiloxanes dissolved in a suitable organic solvent. The drying of these varnishes applied as a thin coating on a support or backing, comprises the evaporation of the solvent and the hardening of the organo-polysiloxanes. Such hardening results from the continuation of the polymerization process and the nearer the degree of polymerization is to its final state, the harder are the coatings obtained. In order to accomplish the drying within a period of time which is feasible from an industrial point of view, the conventional varnish coating, with its support or backing, has to be exposed to a relatively high temperature, generally about 200 to 250° C. The necessity of carrying out this baking operation is a drawback in the use of organo-polysiloxane varnishes, since it prevents their application to supports which are unable to withstand the elevated temperatures indicated above. In order to lower the polymerization temperature or, at a given temperature, in order to reduce the time necessary to obtain the final degree of polymerization, it has been proposed to add to the varnishes substances which are capable of acting as polymerization catalysts, such as lead or cobalt naphthenates. However, the use of such catalysts still requires a baking temperature of at least 150° C. and frequently has disadvantages such as gelation of the varnishes in stock or quick ageing of coatings while they are kept hot.

The object of the present invention is to improve substantially the processes of drying organo-polysiloxane varnishes. It aims at obtaining high grade coatings without baking at elevated temperatures and hence makes possible the application of the organo-polysiloxane varnishes to articles which are not capable of supporting the temperatures heretofore required for baking.

According to this invention, hard, smooth, transparent coatings of organo-polysiloxane varnish are obtained by subjecting to a temperature under 150° C. thin layers of an organo-polysiloxane varnish to which an alkyl orthotitanate has been added.

Quick polymerizing organo-polysiloxanes are particularly suitable for carrying out the process of the invention such as those containing methyl, phenyl, or both of said groups bound with silicon atoms, in a R/Si ratio lower than 1.7. By increasing the percentage of alkyl orthotitanate, we may also use organo-polysiloxanes that polymerize less quickly, such as those in which the R/Si ratio is comprised between 1.7 and 2. We thus may use for our process practically all the organo-polysiloxanes which are suitable for varnishes, whatever be their method of preparation and their composition, although those in which the organic group is phenyl or lower alkyl are preferred.

The action of the alkyl orthotitanate when it is added to an organo-polysiloxane varnish may be considered like that of a polymerization catalyst. The mechanism of its activity is not known and it would be difficult to suggest theoretical considerations in this respect. Let it suffice to state that the effect is produced as soon as the alkyl orthotitanate is dissolved in the varnish.

Dissolution takes place at room temperature, without heating either of the constituents of the mixture, without evolving any heat and without any sign that a reaction takes place between the constituents. A temporary gelation sometimes takes place at the moment the alkyl orthotitanate is added, but it disappears upon agitation or when the mixture is allowed to rest from one day to the next day. The stability of the liquid varnish is excellent and no irreversible gelation takes place in stock. Good results are obtained with organic orthotitanates comprising alkyl groups with 1 to 10 carbon atoms. However, it has been found that for equimolecular quantities, the setting of the varnish is quicker if the number of carbon atoms of the alkyl groups is reduced. Thus, a thin coating of very quickly polymerizing organo-polysiloxane varnish, with 5% ethyl orthotitanate added thereto, dries at ordinary room temperature within a few minutes and gives relatively hard films, while the same varnish, with 33% octyl orthotitanate requires about 1½ to 2 hours to set and gives films which are fairly soft but of a very fine appearance.

The amount of alkyl orthotitanate which it is possible to add to organo-polysiloxane varnishes varies within very wide limits. As a lower limit, in order to obtain the marked effect, we may mention an addition of about 1% alkyl orthotitanate. The upper limit is more difficult to define, as it is dependent on a large number of factors, such as the quality of the organo-polysiloxanes, the nature of the alkyl groups in the orthotitanate, the final polymerization temperature, the duration of this operation, etc. Considered solely from the technical point of view, the upper limit is reached when the properties of the dried varnish coating seem to be impaired in comparison with those of a coating of an organo-polysiloxane varnish without addition of alkyl orthotitanate. As an illustration of the foregoing statements, we may say that at room temperature a varnish containing 50% butyl orthotitanate sets and gives smooth and relatively soft coatings, whereas with 80% butyl orthotitanate, the same varnish gives cracked coatings. If drying is effected at 75° C., the coatings are cracked after 1½ h. when 50% orthotitanate varnish is employed. In practice, the quantity of alkyl orthotitanate which it is advisable to add to organo-polysiloxane varnishes, in order to obtain the required effect, is below the technical upper limit and it only exceptionally exceeds 25 to 30% calculated on the quantity of organo-polysiloxane resin.

One of the main advantages of the process according to our invention resides in the fact that it makes it possible to carry out the final polymerization of organo-polysiloxane resins at temperatures below 150° C., although the latter temperature was heretofore considered to be the lowest for obtaining coatings of polymerized organo-polysiloxanes. In most cases the new process may be carried out at temperatures considerably lower, usually comprised between 50 and 90° C. such as evidenced by the following specific example.

Example 1

An organo-polysiloxane resin with a R/Si ratio=1.6, in which R comprises 55% methyl groups and 45% phenyl groups, was dissolved in toluene at the rate of 3 parts resin to 7 parts solvent. To this varnish we added varying quantities of butyl orthotitanate and the mixtures thus formed were applied in thin layers on glass supports. The different samples were first maintained at a temperature of 25° C. and after 30 minutes their condition was examined. The samples then were heated to 75° C. and after a certain time the hardness of the layer was determined. The determination was made by Wilkinson's pencil method, in which the hardness increases according to the following scale:

6B→5B→ . . . B→H→2H . . . →4H etc.

|  | Amount of butyl orthotitanate added | | | |
|---|---|---|---|---|
|  | 0% | 10% | 20% | 20% |
| Condition of the layers after 30′ at 25° C. | liquid | sticky | dry | dry. |
| Condition of the layers after heating at 75° C. for: |  |  |  |  |
| 15 minutes | do | dry | <6B | 5B. |
| 30 minutes | do | <6B | 6B | 3B. |
| 60 minutes | do | <6B | 5B | B. |
| 90 minutes | do | 6B | 2H | cracked. |
| 120 minutes | do | 5B | 3H |  |

It is seen from these data that for each batch of organo-polysiloxane and alkyl orthotitanate there are obtained, after about 2 hours exposure to the temperature of 75° C., layers of a suitable hardness if the ratio between the organic orthotitanate and the organo-polysiloxane is of the order of 1 to 4. With an orthotitanate containing alkyl groups with fewer carbon atoms, or by carrying out the final polymerization at a slightly higher temperature, for example 90° C., or by prolonging the time of drying, the same effect may be obtained with a smaller proportion of orthotitanate. From the foregoing, it is easy to foresee how the different factors should be varied if it is desired to effect the drying of the layers at a particularly low temperature, for example at 50° C. It is thus possible to adapt the different factors to the most advantageous conditions or working requirements and to extend the application of organo-polysiloxane varnishes to fields which heretofore were not accessible thereto.

The coatings of organo-polysiloxane varnishes obtained by our process are almost colorless and transparent, and at most only slightly opaque if the alkyl orthotitanate content is very high and above 50%. The addition of alkyl orthotitanate does not affect the ability of the organo-polysiloxane varnishes to accept filling materials such as pigments. The novel process also makes it possible to make use of pigments which do not support temperatures above those mentioned above.

The effect of the addition of alkyl orthotitanate to the organo-polysiloxane varnishes finds its most interesting technical application under operating conditions such as those hereabove described and specified. As regards more particularly the final polymerization temperature, the effect of the alkyl orthotitanate is also obtained at temperatures above 150° C.

A particular application of our invention is in the water-proofing of fabrics.

It has already been proposed to make use of the water-repelling properties of organo-polysiloxane resins in the water-proofing of fabrics. However, the carrying out of such processes in actual practice has been impeded because the final polymerization of these resins is obtained only by heating at temperatures which exceed those to which the fabrics may be subjected without being damaged.

In accordance with our invention, the fabrics to be water-proofed are immersed in a treating solution comprising the above described combination of alkyl orthotitanate and organo-polysiloxane resin and, if desired, other substances as described below, dissolved in an organic solvent. After immersion the fabric is drained and is dried at a temperature below 150° C.

The drying of fabrics treated in this manner, and the final polymerization of the organo-polysiloxanes, may be carried out by means of apparatus commonly used for the treatment of textile materials, such as steam-heated presses or calenders. In other cases it is sufficient to iron them by means of a flat iron heated to a moderate temperature. It is also possible to let the heated fabrics stand in a heated atmosphere at a temperature up to 80 to 90° C. In no case should the temperature of 150° C. be exceeded in order to obtain the desired effect and in most cases appreciably lower temperatures will suffice. Under some circumstances a satisfactory result can even be obtained by keeping the water-proofed fabrics for a sufficiently long time at room temperature.

The water-proofing of fabrics obtained by the present process is chiefly due to the water-repelling properties acquired by the textile fibers, rather than to the closing up of the pores in the fabric.

As above noted, organo-polysiloxane resins alone and alkyl orthotitanates alone have a certain water-proofing effect on fabrics impregnated therewith. It is however surprising to see that, when these compounds are used together, the combined effect is very considerably greater than the result of a mere addition. Thus, a cotton fabric impregnated with a solution of organo-polysiloxanes and an alkyl orthotitanate in toluene and dried for 3 hours at 80° C. floats on water for over 1050 hours, whereas the time for flotation of samples treated under the same conditions either with a solution of organo-polysiloxane resins or with a solution of alkyl orthotitanate does not exceed 340 hours and 120 hours, respectively.

In using the above-described organo polysiloxane-alkyl orthotitanate combinations for water-proofing fabrics, we have found that those in which the orthotitanate has alkyl groups with 3 to 5 carbon atoms give results of particular interest. The orthotitanates of the lower alkyl radicals, i. e. methyl and ethyl orthotitanates, are usually less suitable because they frequently give rise to the formation of films of organic polysiloxanes liable to flake owing to premature polymerization. Their presence may however be of use together with very slowly polymerizing organo-polysiloxanes. On the contrary, by using very quickly polymerizing organo-polysiloxanes, it is possible to use the lighter alkyl orthotitanates specified, for example octyl titanate. In most cases however, it seems preferable to use butyl titanate or mixtures of different titanates, for example ethyl in admixture with butyl or octyl, or butyl in admixture with octyl.

Since alkyl orthotitanates will hydrolyze in presence of water, it is advisable to use organic solvents. Among these, there is a considerable choice since, in principle, all solvents for organic-polysiloxane resins and for alkyl orthotitanates are suitable. Good results may be obtained, for example, with chlorinated hydrocarbons such as carbon tetrachloride, white-spirit and other oil derivatives. White-spirit is particularly advantageous because of its lack of toxicity and because it is generally used in dry-cleaning plants, which plants frequently also deal with the water-proofing of fabrics. It is sometimes advantageous to use mixtures of solvents. Thus, the presence of a small amount of toluene in white-spirit is likely to facilitate the solution of the organo-polysiloxane resins.

Although remarkable water-proofing results are obtained with organic-polysiloxanes and alkyl orthotitanates dissolved in an organic solvent, and these results are better than those obtainable with known processes, it is sometimes advantageous to add to the water-proofing liquid substances adapted to act as plasticizers. As such we may mention metallic salts of the higher fatty acids and some distillation residues from the coal and oil industries, such as solid and liquid paraffine and Vaselines.

In order to prevent the formation of mold on the fabrics, we may, if desired, add fungicides, for example pentachloro-phenol, to the water-proofing solution.

The proportions of the different constituents of the water-proofing solutions may vary within wide limits, as will be apparent from the specific examples given below. Generally, the amount of organo-polysiloxane resin dissolved in the solvent only exceptionally exceeds 10 parts by weight in 100 parts by weight of liquid and it is seldom lower than about 0.5 part by weight. The amount of alkyl orthotitanate varies substantially between the same limits, whereas the amount of plasticizer is comprised between 0 and about 6 parts by weight. The invention comprises, however, the water-proofing of fabrics by means of a treating liquid containing, in a state of dissolution in an organic solvent, organo-polysiloxane resins and alkyl orthotitanates, whatever be the proportion of these substances and their respective amounts, and whatever be the substances of a different nature which may be present in the treating liquid.

The following specific examples show various embodiments of our invention as applied to the water-proofing of fabrics, it being understood that further modifications are possible and that the scope of the invention is not limited by the examples.

Example 2

A cotton fabric washed and unstiffened was immersed for 3 minutes in a liquid comprising toluene in which are dissolved 3% of a quickly polymerizing organo-polysiloxane resin and 1% butyl orthotitanate. The fabric was drained in the basket of a centrifugal machine to reduce the absorbed liquid to 50% of the weight of the fabric. The fabric was dried at room temperature, then heated to 75° C. in a chamber for 3 hours. Its degree of waterproofing was determined by means of an apparatus wherein the fabric was subjected to the pressure of a water column of a given height. It was first subjected for 5 minutes to a water head of 5 cm., then the water head was increased to 10 cm. and this was allowed to act for a further period of 5 minutes. The fabric then was subjected for a further period of 5 minutes to a water head of 15 cm. whereafter the water head was increased to 20 cm., and three drops of water trickled through when it reached 19 cm.

Similar results were obtained by treating the fabric with a liquid comprising in a trichloroethylene solution, 2% organo-polysiloxane resin and 3% butyl titanate, and again when treating it with a toluene solution containing 2% organo-polysiloxane resin and 2% butyl orthotitanate. The substitution of butyl orthotitanate by a mixture in equal parts of ethyl orthotitanate and octyl orthotitanate did not substantially alter the degree of water-proofing of the fabric.

Example 3

The same cotton fabric was impregnated for 5 minutes in a liquid containing in a white-spirit solution 2% quick polymerizing organo-polysiloxane resin, 4% butyl orthotitanate and 4% solid paraffine. Drained to 50%, dried as described above, and pressed in an ironing steam-heated press, the fabric was subjected to the water-proofing test. After successively resisting water heads of 5, 10, 15 and 20 cm., each for 5 minutes, it allowed 2 drops of water to trickle through at 23 cm. while the water head was raised to 25 cm.

Example 4

Fabric of very tightly woven cotton poplin, washed and unstiffened, was water-proofed as described in Example 3. When tested, it resisted for five periods of 5 minutes each water heads of 5, 10, 15, 20 and 25 cm. respectively. Three water drops appeared under the pressure of a water head of 30 cm.

Example 5

A fabric of wool gabardine treated as stated in Example 3, allowed in the water-proofing test the appearance of three water drops under a water head of 25 cm., after having resisted for 5 minutes each water heads of 5, 10, 15 and 20 cm.

Example 6

The fabric used in Example 1 was water-proofed by a solution containing in toluene 3% organo-polysiloxane resin 3% butyl orthotitanate and 3% lithium stearate, the latter being partly in suspension. The fabric was drained, dried and heated as described in Example 3. The water-proofing thus obtained corresponded to a resistance to water heads of 5, 10, 15 and 20 cm. respectively, each for a period of 5 minutes. The fabric allowed water to trickle through under a water head of 24 cm. as it was being raised to 25 cm. A similar result was obtained when aluminum stearate was substituted for lithium stearate.

This is a continuation-in-part of our co-pending application Serial No. 268,908 filed January 29, 1952, now abandoned and of our co-pending application Serial No. 275,466, filed March 7, 1952.

What we claim and desire to secure by Letters Patent is:

1. A process of providing on a supporting surface a firm, smooth, non-tacky coating of a hydrocarbon-substituted polysiloxane which comprises mixing, at substantially room temperature, a resinous, polymerizable, hydrocarbon-substituted polysiloxane varnish, wherein the hydrocarbon substituent is selected from the group consisting of the phenyl radical and alkyl radicals having from 1 to 10 carbon atoms, with a polymerization catalyst consisting essentially of an alkyl orthotitanate to form a mixture of said catalyst and said varnish, and before exposing said mixture to substantially higher temperatures applying a thin layer of said mixture to said supporting surface, and baking said layer of the polysiloxane and orthotitanate mixture on said supporting surface.

2. A process of providing on a supporting surface a firm, smooth, non-tacky coating of a hydrocarbon-substituted polysiloxane which comprises mixing, at substantially room temperature, a resinous, polymerizable, hydrocarbon-substituted polysiloxane varnish, wherein the hydrocarbon substituent is selected from the group consisting of the phenyl radical and alkyl radicals having from 1 to 10 carbon atoms, with a polymerization catalyst consisting essentially of an alkyl orthotitanate to form a mixture of said catalyst and said varnish, and before exposing said mixture to substantially higher temperatures applying a thin layer of said mixture to said supporting surface, and baking said layer of the polysiloxane and orthotitanate mixture on said supporting surface by subjecting said layer to a temperature below 150° C.

3. A process of providing on a supporting surface a firm, smooth, non-tacky coating of a hydrocarbon-substituted polysiloxane which comprises mixing, at substantially room temperature, a resinous, polymerizable, hydrocarbon-substituted polysiloxane varnish, wherein the hydrocarbon substituent is selected from the group consisting of the phenyl radical and alkyl radicals having from 1 to 10 carbon atoms, with a polymerization catalyst consisting essentially of an alkyl orthotitanate in the proportion of 1 to 35% of the quantity of said varnish to form a mixture of said catalyst and said varnish, and before exposing said mixture to substantially higher temperatures applying a thin layer of said mixture to said supporting surface, and baking said layer of the polysiloxane and orthotitanate mixture on said supporting surface by subjecting said layer to a temperature below 150° C.

4. A process of providing on a supporting surface a firm, smooth, non-tacky coating of a hydrocarbon-substituted polysiloxane which comprises mixing, at substantially room temperature, a resinous, polymerizable, methyl polysiloxane varnish, with a polymerization catalyst consisting essentially of an alkyl orthotitanate to form a mixture of said catalyst and said varnish, and before exposing said mixture to substantially higher temperatures applying a thin layer of said mixture to said supporting surface, and baking said layer of the polysiloxane and orthotitanate mixture on said supporting surface by subjecting said layer to a temperature below 150° C.

5. A process of water-proofing fabrics which comprises preparing, at substantially room temperature, a composition comprising a mixture of a resinous polymerizable hydrocarbon-substituted polysiloxane, wherein the hydrocarbon substituent is selected from the group conting of the phenyl radical and alkyl radicals having from 1 to 10 carbon atoms, and a polymerization catalyst consisting essentially of an alkyl orthotitanate dissolved in an organic solvent therefor, and before exposing said composition to substantially higher temperatures impregnating said fabric with said composition, and heating the impregnated fabric to dry said fabric and to polymerize the polysiloxane.

6. A process of water-proofing fabrics which comprises preparing, at substantially room temperature, a composition comprising a mixture of a resinous polymerizable hydrocarbon-substituted polysiloxane, wherein the hydrocarbon substituent is selected from the group consisting of the phenyl radical and alkyl radicals having from 1 to 10 carbon atoms, and a polymerization catalyst consisting essentially of an alkyl orthotitanate dissolved in an organic solvent therefor, and before exposing said composition to substantially higher temperatures impregnating said fabric with said composition, and heating the impregnated fabric to a temperature below 150° C. to dry said fabric and to polymerize the polysiloxane.

7. A process as defined in claim 5, wherein the composition containing the polysiloxane and the alkyl titanate further includes a plasticizer.

8. A process of providing a support with a coat of a hydrocarbon-substituted polysiloxane which comprises mixing, at substantially room temperature, a resinous, polymerizable, hydrocarbon-substituted polysiloxane, wherein the hydrocarbon substituent is selected from the group consisting of the phenyl radical and alkyl radicals having from 1 to 10 carbon atoms, with a polymerization catalyst consisting essentially of an alkyl orthotitanate to form a mixture of said catalyst and said polysiloxane, and before exposing said mixture to substantially higher temperatures applying a coat of said mixture to said support, and heating said coat to polymerize said polysiloxane.

9. A process of providing a support with a water-repellent coat of a hydrocarbon-substituted polysiloxane which comprises mixing, at substantially room temperature, a resinous, polymerizable, hydrocarbon-substituted polysiloxane, wherein the hydrocarbon substituent is selected from the group consisting of the phenyl radical and alkyl radicals having from 1 to 10 carbon atoms with a polymerization catalyst consisting essentially of an alkyl orthotitanate dissolved in an organic solvent therefor to form an impregnating composition, and before exposing said composition to substantially higher temperatures impregnating said support with said composition, and heating the support to polymerize the polysiloxane.

No references cited.